United States Patent
Patel et al.

(10) Patent No.: US 9,641,318 B2
(45) Date of Patent: May 2, 2017

(54) SYSTEMS AND METHODS FOR A MULTIPLE VALUE PACKING SCHEME FOR HOMOMORPHIC ENCRYPTION

(71) Applicant: Google Inc., Mountain View, CA (US)

(72) Inventors: Sarvar Patel, Montville, NJ (US); Marcel M. M. Yung, New York, NY (US)

(73) Assignee: GOOGLE INC., Mountain View, CA (US)

( * ) Notice: Subject to any disclaimer, the term of this patent is extended or adjusted under 35 U.S.C. 154(b) by 306 days.

(21) Appl. No.: 14/590,479

(22) Filed: Jan. 6, 2015

(65) Prior Publication Data
US 2016/0359617 A1     Dec. 8, 2016

(51) Int. Cl.
*H04L 9/00* (2006.01)
(52) U.S. Cl.
CPC ................................. *H04L 9/008* (2013.01)
(58) Field of Classification Search
CPC ....................................................... H04L 9/008
See application file for complete search history.

(56) References Cited

U.S. PATENT DOCUMENTS

| | | |
|---|---|---|
| 8,625,782 B2 | 1/2014 | Rane et al. |
| 8,630,422 B2 | 1/2014 | Gentry |
| 8,667,062 B2 | 3/2014 | Aad et al. |
| 2007/0171050 A1* | 7/2007 | Westhoff ............... H04W 12/02 340/539.22 |
| 2008/0212780 A1* | 9/2008 | Lemma ................. G10L 19/018 380/277 |
| 2013/0097417 A1* | 4/2013 | Lauter .................... H04L 9/008 713/150 |

OTHER PUBLICATIONS

Alattas, R., Cloud Computing Algebraic Homomorphic Encryption Scheme, International Journal of Innovation and Scientific Research, Sep. 2014, 8(2), pp. 191-195.
Baudron, O., et al., Practical Multi-Candidate Election System, Proceedings of the 20th ACM Symposium on Principles of Distributed Computing (PODC '01), Aug. 26-29, 2001, Newport, Rhode Island, N. Shavit Ed. ACM Press, New York, pp. 274-283.
International Search Report and Written Opinion—PCT/US2015/059874—ISA/EPO, dated Feb. 8, 2016, 12 pages.

(Continued)

*Primary Examiner* — Beemnet Dada
(74) *Attorney, Agent, or Firm* — Procopio, Cory, Hargreaves & Savitch LLP

(57) ABSTRACT

Systems and methods for a multiple value packing scheme for homomorphic encryption are described, including at a server, generating a plurality of encrypted payloads, each having a plurality of data values; and at a client, receiving each of the encrypted payloads having the plurality of data values; and multiplying one or more of the data values of one of the encrypted payloads by one or more other data values in one or more of the other encrypted payloads, to generate a product that represents the summation of data values corresponding to the multiplied one or more data values of the encrypted payloads and the one or more of the other data values in the one or more other encrypted payloads.

22 Claims, 11 Drawing Sheets

(56) References Cited

OTHER PUBLICATIONS

George Danezis et al: "Space-Efficient Private Search with Applications to Rateless Codes", Feb. 12, 2007, Financial Cryptography and Data Security; D1 [Lecture Notes in Computer Science]. Springer Berlin Heidelberg, Berlin, Heidelberg, p. 148-162, XP019136991, ISBN: 978-3-540-77365-8.
Rakesh Agrawal et al: "Information sharing across private databases", SIGMOD 2003. Proceedings of the ACM SIGMOD International Conference on Management of Data. San Diego, CA, Jun. 9-12, 2003 (Jan. 1, 2003). p. 86, XP055245742, US. DOI: 10.1145/872757.87277, ISBN: 978-1-58113-634-0.
Jaideep Vaidya et al: "Secure Set Intersection Cardinality with Application to Association Rule Mining", Mar. 15, 2004, XP055245756.
Pailler Ped—Stern J (Ed): "Public-Key Cryptosystems Based on Composite Degree Residuosity Classes", Jan. 1, 1999, Advances in Cryptology—Eurocrypt '99 . International Conf. on the Theory and Application of Cryptographic Techniques. Prague, CZ, May 2-6, 1999 Proceedings; [Lecture Notes in Computer Science], Berlin Springer, DE, pp. 223-238.

* cited by examiner

US 9,641,318 B2

SYSTEMS AND METHODS FOR A MULTIPLE VALUE PACKING SCHEME FOR HOMOMORPHIC ENCRYPTION

BACKGROUND

Field

The subject matter discussed herein relates generally to data processing and, more particularly, to systems and methods for homomorphic encryption using a multiple value packing scheme.

Related Background

In the related art, a database, database as a service, or cloud database operation may be performed. More specifically, the database server may holds the data of the user (e.g., user transport data), and the user may perform an operation on the data (e.g., a query). The user may have data which is sensitive, which he or she does not want the server (e.g., cloud owner) to know.

Homomorphic cryptography, such as Paillier cryptography, includes many properties. For example, given two values V1 and V2 (referred to as plaintexts), E(V1)=C1 (i.e., encrypting V1 resulting the ciphertext C1) and E(V2)=C2. One of the properties of homomorphic cryptography is that the product of two ciphertexts C1 and C2 will decrypt to the sum of their corresponding plaintexts V1 and V2.

With an increasing volume of data and number of transactions being handled on the server side, there is a need to reduce a number of bytes that must be transferred to implement homomorphic cryptography.

SUMMARY

The subject matter includes computer-implemented methods for performing homomorphic encryption to generate a summation, including, at a client, receiving a plurality of encrypted payloads, and of the encrypted payloads having a plurality of data values; and multiplying one or more of the data values of one of the encrypted payloads by one or more other data values in one or more of the other encrypted payloads, to generate a product that represents the summation of data values corresponding to the multiplied one or more data values of the one of the encrypted payloads and the one or more other data values in the one or more other of the encrypted payloads.

The subject matter also includes a computer-implemented method of performing homomorphic encryption to generate a summation, including at a server, at a server, generating a plurality of encrypted payloads, each having a plurality of data values, wherein the data values of each of the encrypted payloads are positioned at a lower half of each of the encrypted payloads, and an upper half of each of the encrypted payloads is empty.

Further, the subject matter includes a computer-implemented method of performing homomorphic encryption to generate a summation, the method including at a server, generating a plurality of encrypted payloads, each having a plurality of data values; and at a client, receiving each of the encrypted payloads having the plurality of data values; and multiplying one or more of the data values of one of the encrypted payloads by one or more other data values in one or more of the other encrypted payloads, to generate a product that represents the summation of data values corresponding to the multiplied one or more data values of the encrypted payloads and the one or more of the other data values in the one or more other encrypted payloads.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods associated with a multiple value packing scheme for homomorphic encryption.

Figure 1:
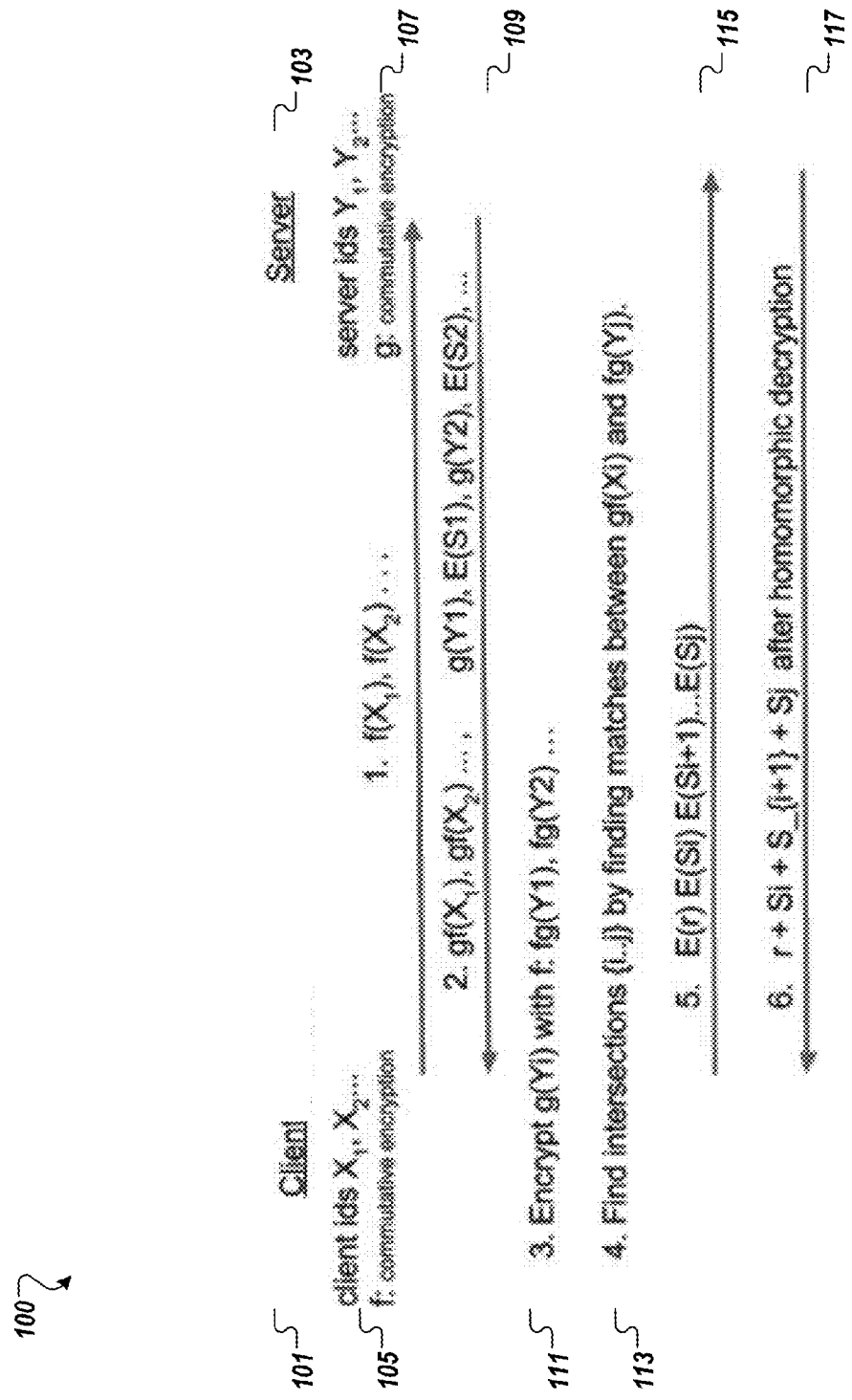
FIG. 1 shows a related art approach to packing.

FIG. 1 illustrates a related art approach to homomorphic encryption 100, employing Paillier encryption (e.g., multiplication of ciphertext, addition of plaintext). A client 101 and a server 103 are provided. At 105, the client 101 performs an encryption of a plurality of IDs X1 ... Xn ... using commutative encryption with key f. The result of the encryption performed at 105 by the client 101 is sent to the server 103. For example, the commutative encryption may be exponentiation with a secret exponent modulo a large prime.

At 107, the server 103 receives the encrypted IDs f(X1) ... f(Xn) ... from the client 101, and performs an encryption operation with key g, and sends g(X1) ... g(Xn) to the client 101. Further, the server 103 encrypts server IDs Y1 ... Ym with key g, and sends g(Y1) ... g(Ym) to the client 101, along with the value (e.g., spend) Si, encrypted with Paillier homomorphic encryption E. The encrypted values of the numbers are provided to the client 101 as individual, separate payloads for each of the numbers (e.g., spend values).

At 111, at the client 101, the server IDs g(X1) ... g(Xn) are further encrypted with key f to generate fg(Y1) ... fg(Ym). At 113, the client 101 performs a checking operation to determine if there is a match or intersection between gf(Xi) and fg(Yj). Such a match or intersection would indicate that Xi equals Yj.

At 115, for the intersections, the client 101 multiplies all of the values of E(Sj), which are the encrypted values of Sj, to generate a product, which will be the same as the encryption of the sum of the clear values of Sj. The client 101 may request the server 103 to decrypt the product and return the sum. To avoid revealing the sum during the return process, the client 101 may perform a blinding operation, i.e., multiply the product by E(r), to return a random number r.

At 117, the server 103 Paillier decrypts and returns the result to the client 101. To obtain the clear sum, the client 101 subtracts random number r from the result sent by the server 103 to the client 101.

Figure 2:
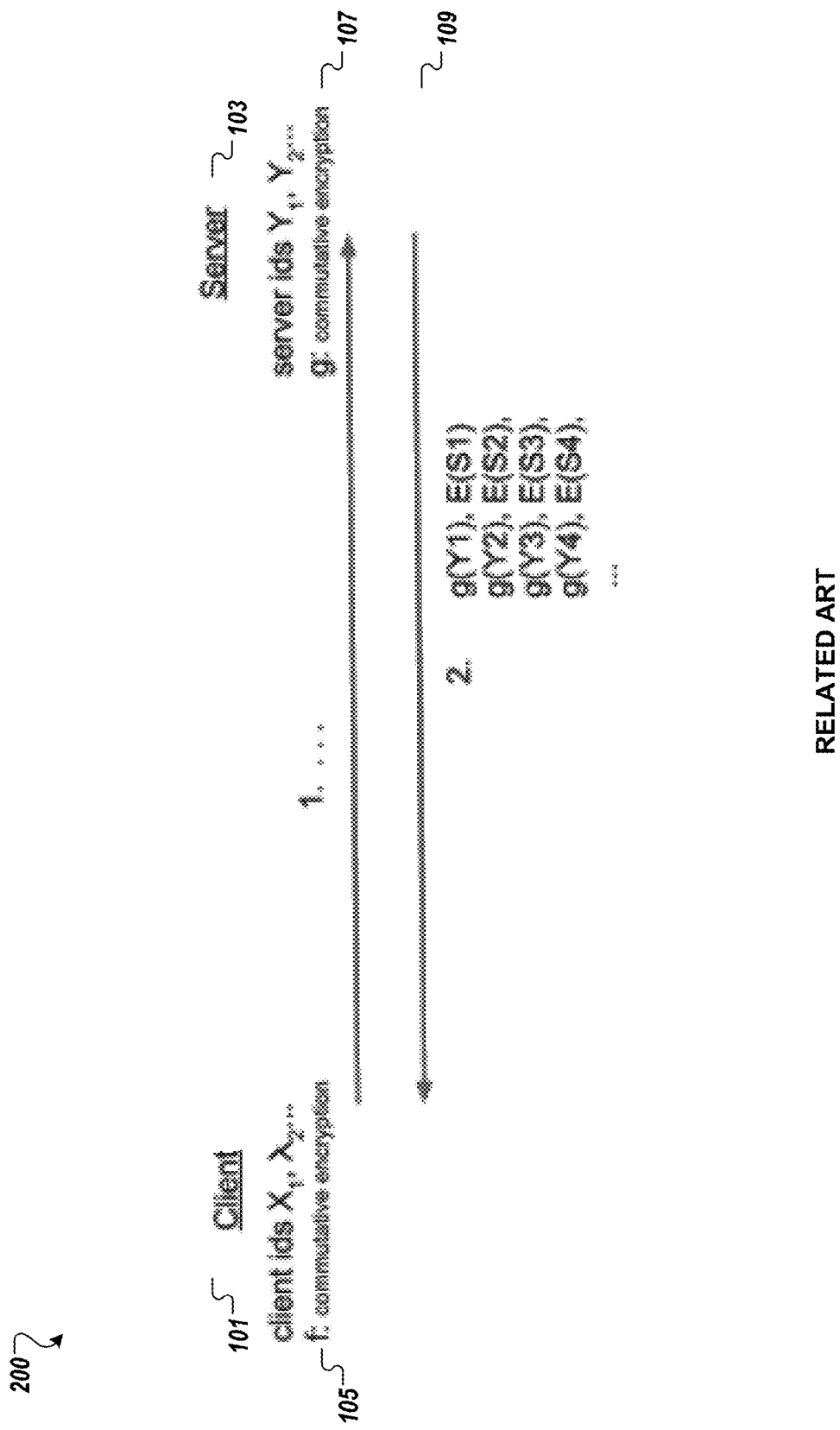
FIG. 2 shows a related art approach to unpacking.

FIG. 2 illustrates a related art approach 200 to operation 109 as explained above. For the sake of clarity, further explanation of the same reference numerals as discussed above with respect to FIG. 1 is omitted. More specifically, in operation 109, the server 103 sends an encrypted ID and the associated Paillier encrypted spend value (e.g., g(Yi) along with E(Si)).

Figure 3:
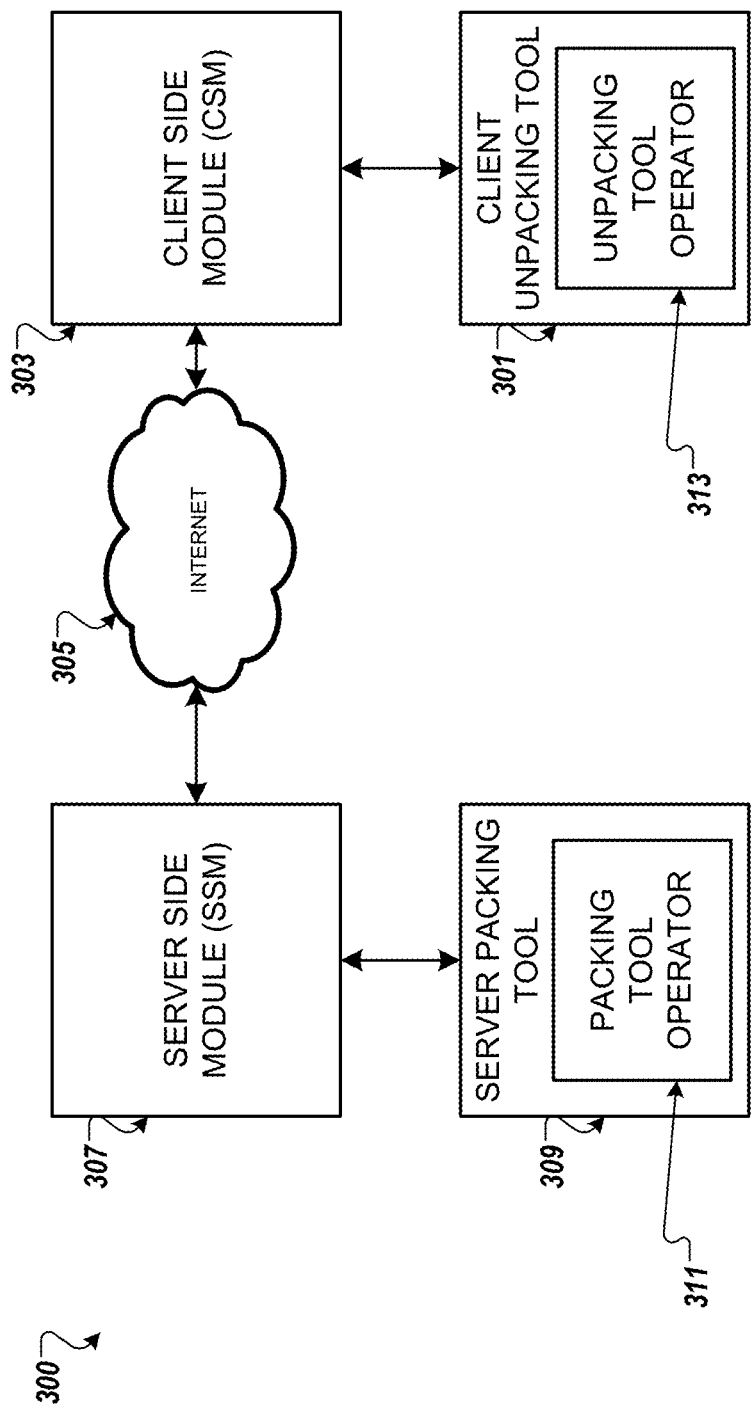
FIG. 3 shows an architecture for the packing tool and the unpacking tool according to an example implementation.

FIG. 3 illustrates an example architecture 300. A client side module 303 is provided that generates IDs of the client, and sends the encrypted IDs via the Internet 305, for example, to the server side module 307. The server side module 307 may encrypt data received from the client side module 303, such as the client-encrypted IDs. The server side module also controls the server packing tool 309.

The server packing tool 309 includes a packing tool operator 311, which controls the server packing tool 309. For example, multiple data values may be packed into a single payload at the command of the packing tool operator 311, such that the server packing tool 309 provides a plurality of such encrypted payloads to the server side module 307. The server side module 307 provides the encrypted payloads to the client side module 303. Further details of the encrypted payloads are discussed below with respect to FIG. 4.

The client unpacking tool 301 receives the encrypted single payloads. More specifically, an unpacking tool operator 313 performs a series of left-shifting operations on each of the single payloads from the client side module 303, which were in turn received from the server side module 307. The left-shifting operations use exponentiation to shift the values within the single payloads, such that the desired value is in a prescribed position. When the left-shifting operation has been completed, a product of the encrypted data values is obtained at the client unpacking tool 301, which is associated with a sum of the plaintext values. Optionally, the client side module 303 may blind the product, and request for the server side module 303 to decrypt and return a blinded sum to the client side module, which unblinds the blinded sum to obtain the plaintext sum that represents the value (e.g., spend value).

Figure 4:
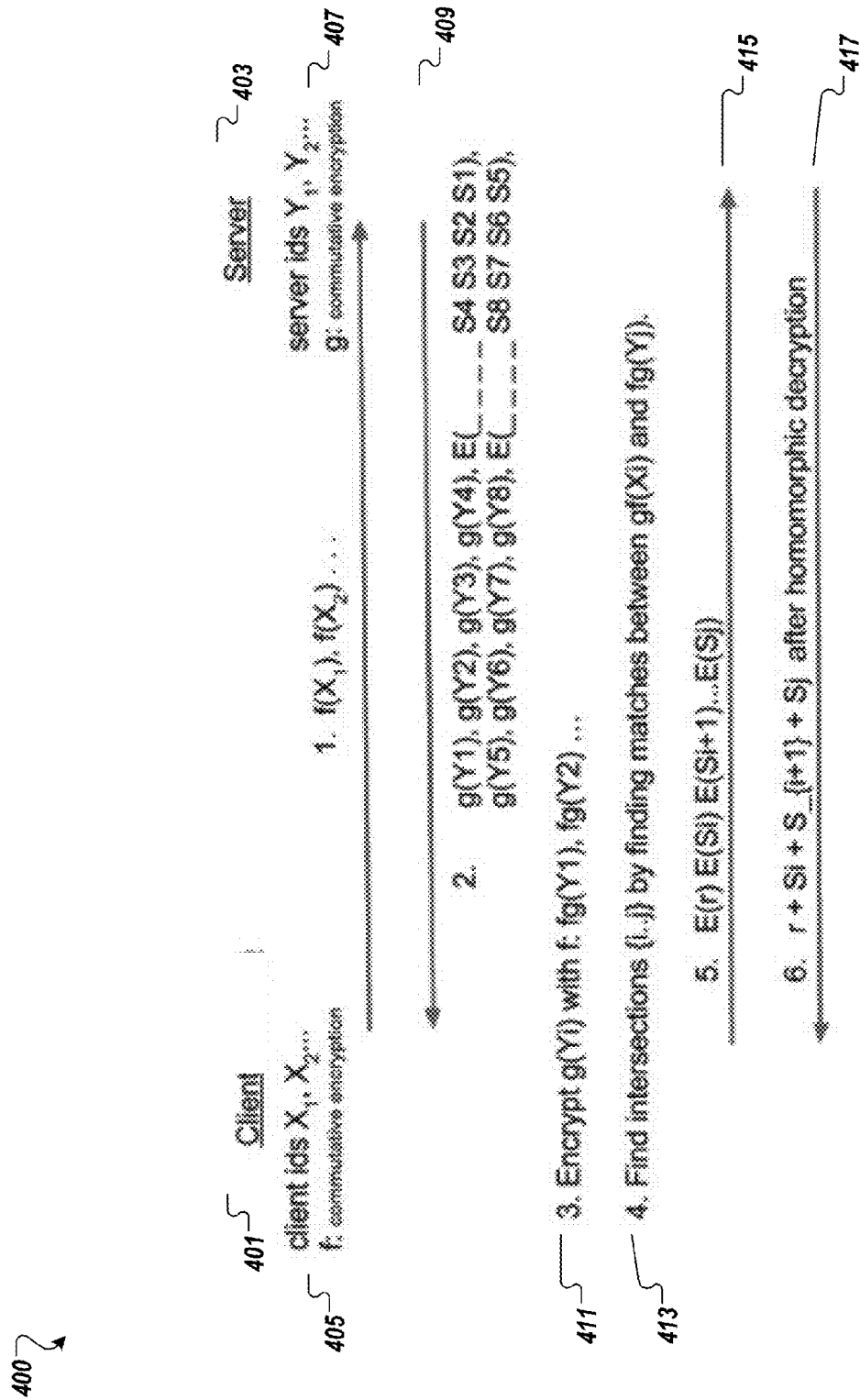
FIG. 4 shows a packing process according to an example implementation.

FIG. 4 shows an example of a process implementation associated with a packing operation according to the example implementation. As shown in FIG. 4, a client 401 is provided to communicate with a server 403. At the client 401, as noted above in element 105 with respect to FIGS. 1 and 2, the client 101 performs an encryption of a plurality of IDs X1 . . . Xn . . . using commutative encryption with key f. The result of the encryption performed at 105 by the client 101 is sent to the server 103. For example, but not by way of limitation, the commutative encryption may be exponentiation with a secret exponent modulo a large prime.

At the server 403, in 407, the server 403 receives the encrypted IDs f(X1) . . . f(Xn) . . . from the client 401, and performs an encryption operation with key g, and optionally sends g(X1) . . . g(Xn) to the client 401. Further, at 409, the server 403 sends to the server 401 the value (e.g., spend) Si, encrypted with Paillier homomorphic encryption E. Optionally, the server 403 encrypts server IDs Y1 . . . Ym with key g, and sends g(Y1) . . . g(Ym) to the client 401.

According to the example implementation, at 409, the server 403 includes (e.g., packs) multiple values (e.g., four spend values S1 . . . S4) into a single Paillier payload, which are then encrypted and sent to the client 401. Within each of the plurality of single payloads, each of the values is separated from other values by a 32-bit guard. In other words, 32 bits of space is provided between S1 and S2, for example. The purpose of the spacing is to allow carryover to not intrude onto neighboring numbers. Thus, for example, but not by way of limitation, 128 bits may be used to represent each number, assuming that the numbers are 64-bit integers (e.g., int64) having 96 bits of representation, and 32 bits of zeroes as a guard or separator between neighboring numbers. As a result, up to $2^{32}$ possible values may be used without a carryover problem.

While int64 is used in the example implementation, the present inventive concept is not limited thereto, and other sizes of integer, payload and spacing may be used as would be understood by those skilled in the art, without departing from the scope of the inventive concept. For example, but not by way of limitation, these values may be determined based on the application.

Further, the values only cover the lower half of each of the encrypted payloads. The most significant (e.g., upper) half is kept empty. As explained below with respect to FIG. 5, the upper half may be employed during the unpacking operation for a shifting process.

Accordingly, multiple spend values are packed into each of the single payloads by the server 403, and are encrypted and sent to the client 401. Accordingly, the number of bytes that need to be transferred may be reduced by 1/N, where N is the number of values on each of the single payloads. In the present example, the number of bytes that need to be transferred would be reduced by ¼ (i.e., one-fourth).

At 411, at the client 401, the server IDs g(X1) . . . g(Xn) are further encrypted with key f to generate fg(Y1) . . . fg(Ym). At 413, the client 401 performs a checking operation to determine if there is a match or intersection between gf(Xi) and fg(Yj). Such a match or intersection would indicate that Xi equals Yj. As explained in greater detail below with respect to FIG. 5, an unpacking operation is performed that involves a shifting operation.

At 415, for the intersections, the client 401 multiplies all of the values of E(Sj), which are the encrypted values of Sj, to generate a product, which will be the same as the encryption of the sum of the clear values of Sj. The client 401 may request the server 403 to decrypt the product and return the sum. To avoid revealing the sum during the return process, the client 401 may perform a blinding operation, i.e., multiply the product by E(r), to return a random number r.

At 417, the server 403 Paillier decrypts and returns the result to the client 403. To obtain the clear sum, the client 401 subtracts random number r from the result sent by the server 403 to the client 401.

Figure 5:
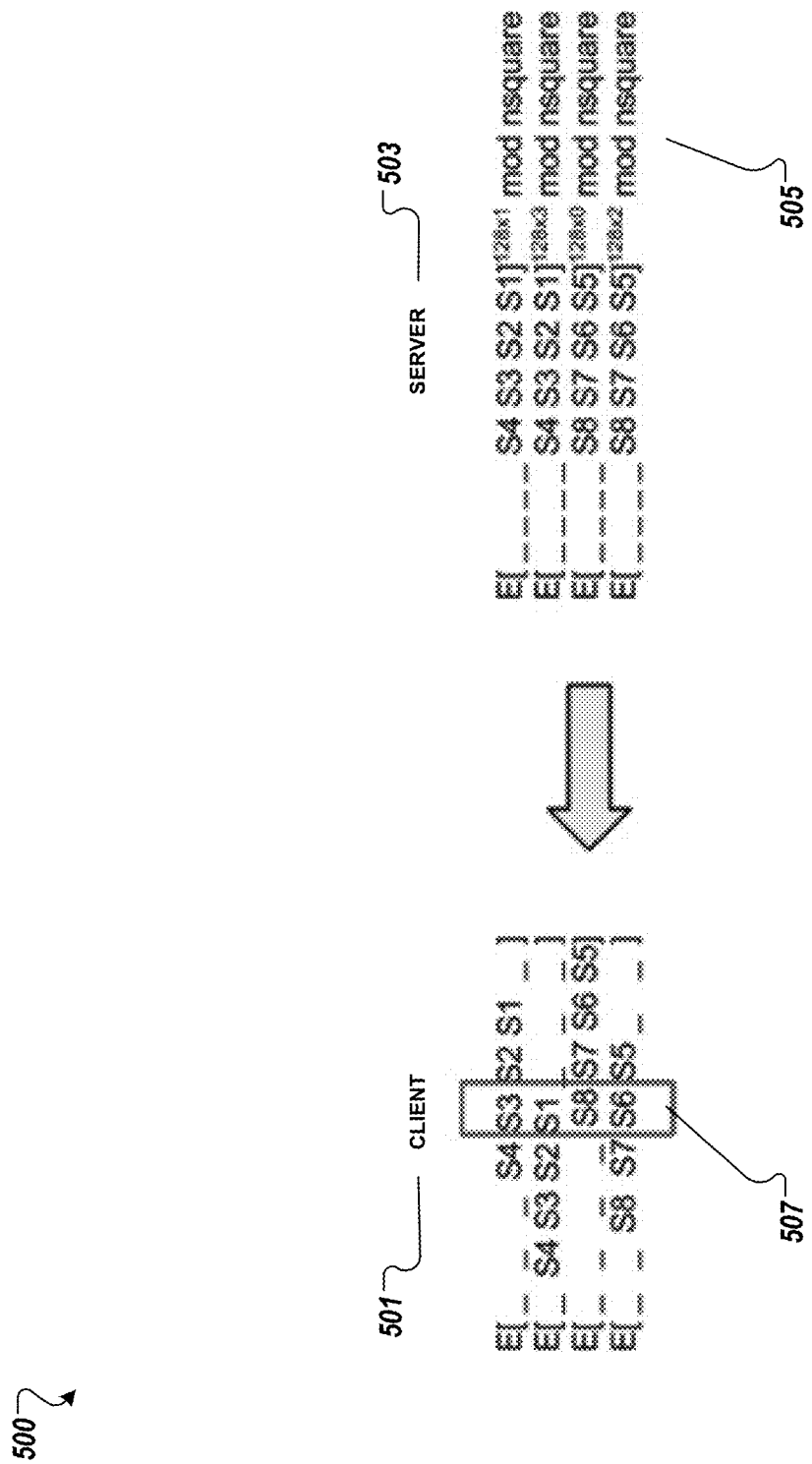
FIG. 5 shows an unpacking process according to an example implementation.

FIG. 5 illustrates an unpacking operation according to an example implementation. As shown in FIG. 5, server 503 provides the payload 505 to the client 501. The payload 505 is discussed above with respect to FIG. 4, and further details are omitted for the sake of clarity.

In the example implementation of FIG. 5, the client 501 needs to multiply the encrypted values of E(S3), E(S1), E(S8) and E(S6). Accordingly, these encrypted values must be positioned at a prescribed position in the payload. For example, the encrypted values of E(S3), E(S1), E(S8) and E(S6) are positioned in the fourth position 507 in FIG. 5. Accordingly, the encrypted values in all other positions will be ignored.

Accordingly, the encrypted values of E(S3), E(S1), E(S8) and E(S6) must be shifted to the fourth position 507 to perform the multiplication of these encrypted values. To accomplish the shifting, the Paillier-encrypted ciphertext is exponentiated by 2, which moves the corresponding plaintext value one bit to the left.

For example, to move E(S3) to the fourth position, and shift the plaintext S3 by 128 bits, it is necessary to exponentiate the ciphertext by 128×1 value. In the second payload, to shift E(S1) three positions to the left, thus placing E(S1) in the fourth position on the payload, the ciphertext is exponentiated to 128×3, to shift it to the left by 3 positions. With respect to E(S8), this is already in the fourth position and does not need to be shifted. Next, with respect to E(S6), this is in the second position and needs to be moved to the fourth position, and thus needs to be exponentiated with 128×2, in order to shift to the fourth position in the plaintext.

Accordingly, the ciphertext product of the encrypted data values that is produced represents a sum of the plaintext associated with a sum of the data values of the ciphertext. As a result, in the foregoing example implementation, the shifted ciphertext is multiplied to produce a ciphertext, for which the underlying plaintext is the sum of S3+S1+S8+S6.

At the client 501, the server IDs g(X1) . . . g(Xn) are further encrypted with key f to generate fg(Y1) . . . fg(Ym). The client 501 thus performs a checking operation to determine if there is a match or intersection between gf(Xi) and fg(Yj). Such a match or intersection would indicate that Xi equals Yj.

For the intersections, the client 501 multiplies all of the values of E(Sj) associated with the each of the plurality of single payloads, which are the encrypted values of Sj, to generate a product, which will be the same as the encryption of the sum of the clear values of Sj. The client 501 may request the server 503 to decrypt the product and return the sum. To avoid revealing the sum during the return process, the client 501 may perform a blinding operation, i.e., multiply the product by E(r), to return a random number r.

The server 503 then Paillier decrypts and returns the result to the client 501. To obtain the clear sum, the client 501 subtracts random number r from the result sent by the server 503 to the client 501.

In the foregoing example implementation, when the client 501 receives the decryption from the server 503, the client 501 may ignore numbers in the position other than the prescribed position 507. Thus, the client 501 only needs to extract the value of the prescribed position (e.g., fourth position in element 507 of FIG. 5). Further, because of the 32 guard bits adjacent to each encrypted data value, adding to the neighboring encrypted data values does not carry over into other positions.

While the foregoing example implementations refer to packing with 64 bit integers, other values may be substituted therefor. For example but not by way of limitation, ten (10) numbers could be packed into each of the encrypted payloads, which would reduce the bandwidth needed by 1/10. Such an approach may be adopted, for example, when the largest value is not greater than 1,000,000 (e.g., a spend value not greater than one million dollars).

As an alternative to the foregoing example implementation, a Damgard version of Paillier encryption may be employed. For example, but not by way of limitation, ciphertexts that are (s+1)/s times larger than the payload may be employed. In the case of direct Paillier encryption, s has a value of 1, and there is an expansion of (1+1)/1=2. On the other hand, if s having a value of 3 is used, then a (3+1)/2=4/3 expansion would result. Thus, a 4096 bit (e.g., 512 byte) ciphertext and a 3072 bit payload results, such that 30 numbers can be fit into the payload. Accordingly, each encryption has a greater associated cost, but fewer encryptions are required, due to the larger numbers.

Figure 6:
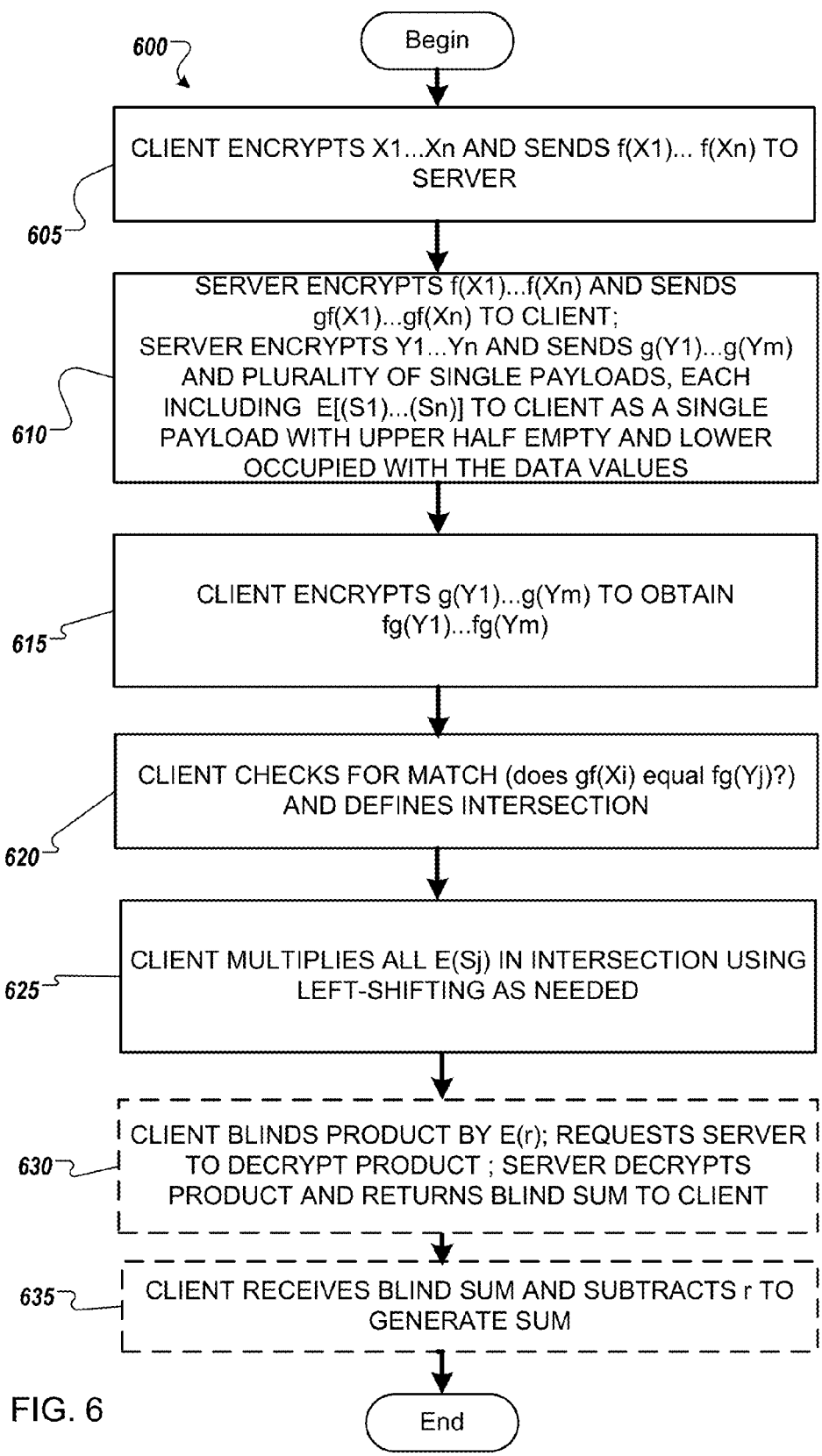
FIG. 6 illustrates a system process associated with the example implementation.
Figure 7:
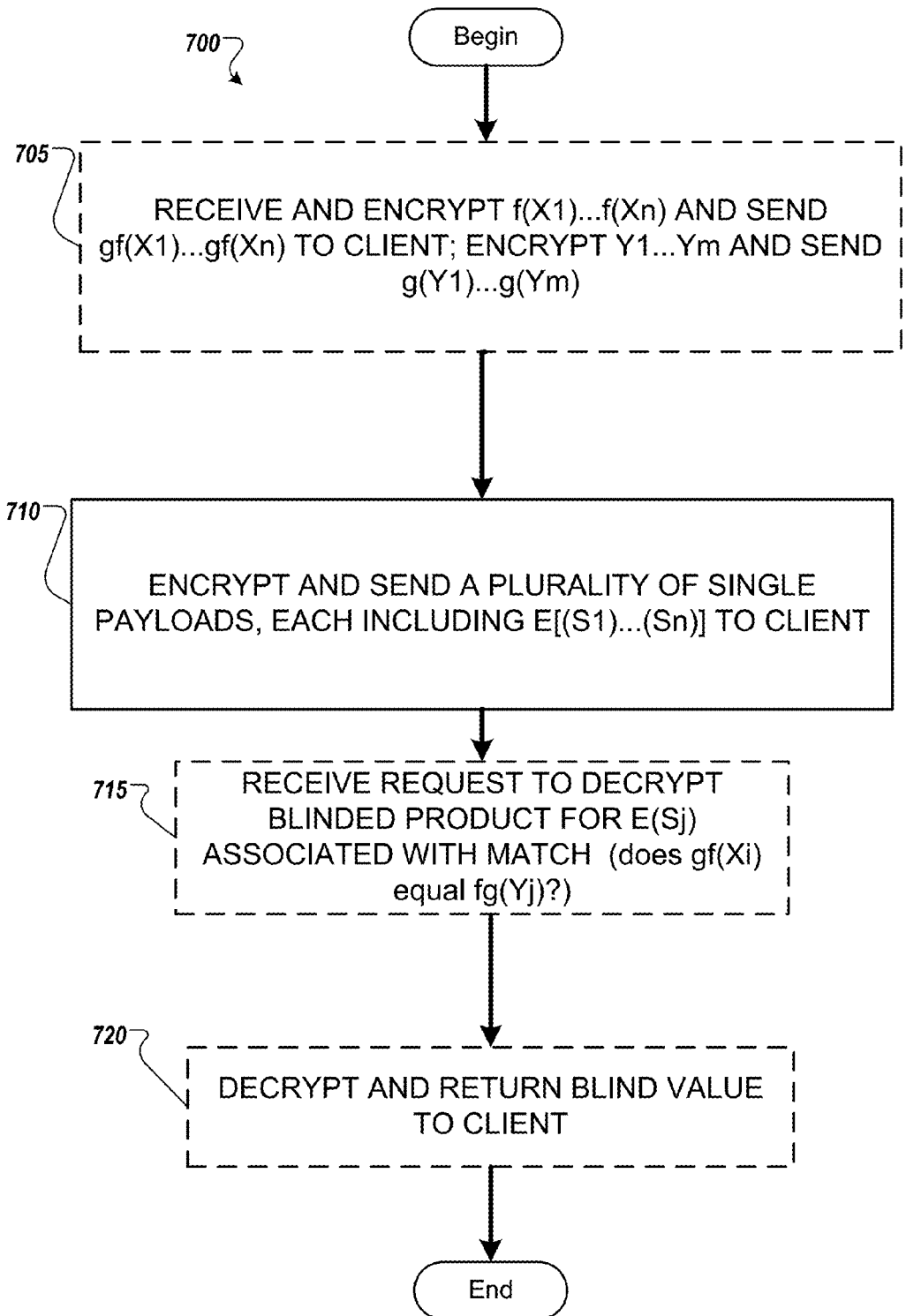
FIG. 7 illustrates a server process associated with the example implementation.
Figure 8:
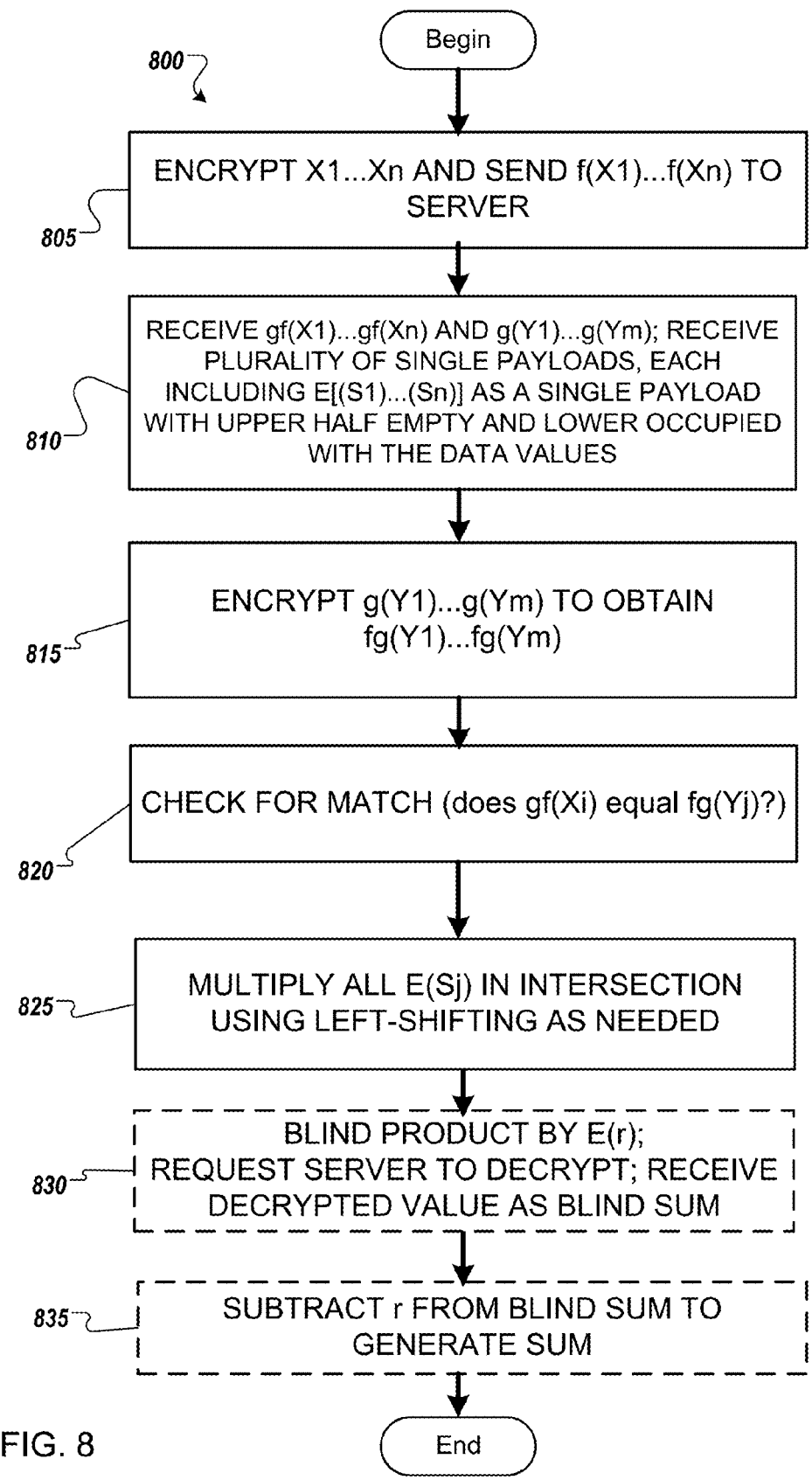
FIG. 8 illustrates a client process associated with the example implementation.

FIGS. 6-8 illustrate example processes associated with the foregoing example implementation. In some examples, processes 600-800 may be implemented with different, fewer, or more blocks. Processes 600-800 may be implemented as computer executable instructions, which can be stored on a medium, loaded onto one or more processors of one or more computing devices, and executed as a computer-implemented method.

FIG. 6 illustrates an example process 600 according to one or more of the foregoing example implementations. At 605, a client encrypts a plurality of values X1 . . . Xn. For example, but not by way of limitation, the values X1 . . . Xn may be encrypted using a Paillier encryption scheme. The corresponding encrypted values f(X1) . . . f(Xn) are then provided to a server.

At 610, a server receives the encrypted values f(X1) . . . f(Xn) and performs an encryption operation on these values. The resulting values encrypted by the server (e.g., Paillier encryption) are provided to the client as gf(X1) . . . gf(Xn). Also at 610, the server encrypts (e.g., Paillier encryption) and sends g(Y1) . . . g(Ym) to the client. Further, at 610, a plurality of single payloads E[(S1) . . . (Sn)], each including a plurality of the values (e.g., spend values), are generated. The single payloads E[(S1) . . . (Sn)] each maintain the most significant bits (e.g., upper half) as empty, and provide the encrypted data values in the lower half. As explained above, the encrypted data values are spaced apart by guard bits in each of the payloads E[(S1) . . . (Sn)].

As explained below in greater detail, optionally, at 610 an operation may be performed at the server on the encrypted data values, wherein the encrypted data values E[(S1) . . . (Sn)] represent a vector of one or more of the data values at a plurality of positions. According to the operation, at least one of multiplying the encrypted payloads E[(S1) . . . (Sn)] by an encryption of constant values, and multiplying the encrypted payloads E[(S1) . . . (Sn)] to shift the positions of the data values that are associated with the vector, in the payload, may be performed.

At 615 and 620 operations are performed to determine an intersection based on matching between the IDs provided by the client and the server. At 615, the client encrypts g(Y1) . . . g(Ym) to obtain fg(Y1) . . . fg(Ym). Then, the client checks for a match between fg(Yj) and the above-explained gf(Xi) at 620. Based on operations 615 and 620, an intersection is determined.

At 625, a shifting operation is performed as explained above with respect to FIGS. 4 and 5. For example, but not by way of limitation, for the values of E(Sj) with respect to the above-derived intersection, the shifting and exponentiation process as described above is performed. Accordingly, the encrypted data values as represented by E(Sj) at the appropriate left-shifted position are multiplied, for each of the encrypted payloads E[(S1) . . . (Sn)]. Thus, a product of the encrypted data values in each of the single payloads E[(S1) . . . (Sn)], that is associated with a sum of the plaintext values, is generated.

Optionally, as a part of the multiplying operation of 625 at the client, and as noted above, the one or more data values of the one of the encrypted payloads E[(S1) . . . (Sn)] may be at a first position (i) in the vector, and may be multiplied by the one or more other data values in the one or more of the other encrypted payloads E[(R1) . . . (Rn)] that may be at a second position (j) in the second vector, to generate the above-noted product that represents the summation of the data values corresponding to the multiplied one or more data values of the one of the encrypted payloads being the encrypted value of (Si+Rj) in the resulted encrypted vector E[(U1) . . . (Un)]. Namely a third position (k) is such that Uk=Si+Rj in the resulting encrypted vector.

Optionally, operations 630 and 635 may be performed. For example, but not by way of limitation, at operation 630, the client performs an encryption operation on the product by encrypting a random number r to generate an encrypted value of the random number r as E(r), which is multiplied by the product. A request is sent to the server to decrypt the blinded product. The server thus decrypts the blinded product, and returns the blinded sum to the client. At operation 635, the client receives the blind sum and subtracts r to generate the plaintext sum.

FIG. 7 illustrates a process 700 according to an example implementation associated with example server-side operations of the present inventive concept. Some aspects previously explained above with respect to FIG. 6 are not repeated herein, for the sake of clarity and conciseness.

Optionally, at operation 705, a server receives f(X1) . . . f(Xn) from, for example, a client, which are encrypted values of client IDs X1 . . . Xn. The server performs an encryption of f(X1) . . . f(Xn) to generate and send gf(X1) . . . gf(Xn) to the client. Further, the server generates and encrypts IDs Y1 . . . Ym, and thus sends g(Y1) . . . g(Ym) to the client.

At operation 710, data values S1 . . . Sn are placed in a single payload E[(S1) . . . (Sn)] and an encryption operation is performed on the data values, to generate encrypted data values E(S1) . . . E(Sn), which are spaced apart by guard bits as explained above. As also explained above, the encrypted data values E(S1) . . . E(Sn) are positioned in the lower half of each of the payloads, such that the upper half of the payloads (e.g., most significant bits) is left empty.

As explained below in greater detail, optionally, at 710 an operation may be performed at the server on the encrypted data values, wherein the encrypted data values E[(S1) . . . (Sn)] represent a vector of one or more of the data values at a plurality of positions. According to the operation, at least one of multiplying the encrypted payloads E[(S1) . . . (Sn)] by an encryption of constant values, and multiplying the encrypted payloads E[(S1) . . . (Sn)] to shift the positions of the data values that are associated with the vector, in the payload, may be performed.

At operation 715, the server optionally receives a request to decrypt a blinded product for E(Sj). For example, the server may receive the blinded request as explained above in FIG. 6. At operation 720, the blinded product is decrypted and provided to the client.

FIG. 8 illustrates a process 800 according to an example implementation associated with example client-side operations of the present inventive concept. Some aspects previously explained above with respect to FIG. 6 are not repeated herein, for the sake of clarity and conciseness.

At 805, the client encrypts IDs X1 . . . Xn as f(X1) . . . f(Xn), and sends the encrypted values to the server. At 810, the client receives server-encrypted values of the client IDs X1 . . . Xn as gf(X1) . . . gf(Xn) and encrypted IDs of the server IDs Y1 . . . Ym as g(Y1) . . . g(Ym). Further, the client receives a plurality of packed payloads, each including E[(S1) . . . (Sn)] as a single payload with upper half empty and lower occupied with the data values, as explained above with respect to FIG. 6.

At 815 and 820 operations are performed to determine an intersection based on matching between the IDs provided by the client and the server. At 815, the client encrypts g(Y1) . . . g(Ym) to obtain fg(Y1) . . . fg(Ym). Then, the client checks for a match between fg(Yj) and the above-explained gf(Xi) at 820. Based on operations 815 and 820, an intersection is determined.

At 825, a shifting operation is performed as explained above with respect to FIGS. 4 and 5. For example, but not by way of limitation, for the values of E(Sj) for the plurality of single payloads E[(S1) . . . (Sn)], with respect to the above-derived intersection, the shifting and exponentiation process as described above is performed. Accordingly, the encrypted data values as represented by E(Sj) at the appropriate left-shifted position are multiplied. Thus, a product of the encrypted data values that is associated with a sum of the plaintext values is generated.

Optionally, as a part of the multiplying operation of 825 at the client, and as noted above, the one or more data values of the one of the encrypted payloads E[(S1) . . . (Sn)] may be at a first position (i) in the vector, and may be multiplied by the one or more data values in the one or more of the other encrypted payloads E[(R1) . . . (Rn)] that may be at a second position (j) in the second vector, to generate the above-noted product that represents the summation of the data values corresponding to the multiplied one or more data values of the one of the encrypted payloads being the encrypted value of (Si+Rj) in the resulted encrypted vector E[(U1) . . . (Un)]. Namely, a third position (k) is such that Uk=Si+Rj in the resulting encrypted vector.

Optionally, operations 830 and 835 may be performed. For example, but not by way of limitation, at operation 830, the client performs an encryption operation on the product by encrypting a random number r to generate an encrypted value of the random number r as E(r), which is multiplied by the product. A request is sent to the server to decrypt the blinded product. The server thus decrypts the blinded product, and returns the blinded sum to the client. At operation 835, the client receives the blind sum and subtracts r to generate the plaintext sum.

In addition to the foregoing example implementation, other example implementations may be provided. For example, but not by way of limitation, the plurality of the elements in the payload may be a vector, as explained below.

Ciphertexts of public key encryption may be large with respect to the plaintext data element, which is substantially shorter than the ciphertexts. Further, the sum of the plaintexts is substantially shorter than the size of a ciphertext. Accordingly, in this alternative example implementation, the encryption payload may represent a plurality or a positioned plurality (e.g., a vector) of element values, and may thus save significant space.

According to this alternative example implementation, multiplying the encrypted payload adds the payload element in the vector per-position, and may simplify the adding of a position i at a first vector encryption with position j element, where j is different from i, at a second vector encryption.

Thus, the present example implementation provides a method that allows the homomorphic operation to be performed across the positions. Accordingly, the resulting encrypted vector will have at some position k the result (e.g., sum) of the elements in the original vector position i element of the first encrypted payload ciphertext and the position j element of the second encrypted vector payload.

Accordingly, extended flexibility of homomorphic operation may be provided on elements that are encrypted in the same payload, so that regardless of positions, the operation can be performed on data elements under encryption (e.g., ciphertext payload) without the need to decrypt the payload and perform such operations on the plaintext elements. The example implementation always maintains the elements as encrypted, while allowing flexible operation on the elements (e.g., adding vector elements, regardless of their position inside the vector).

Figure 9:
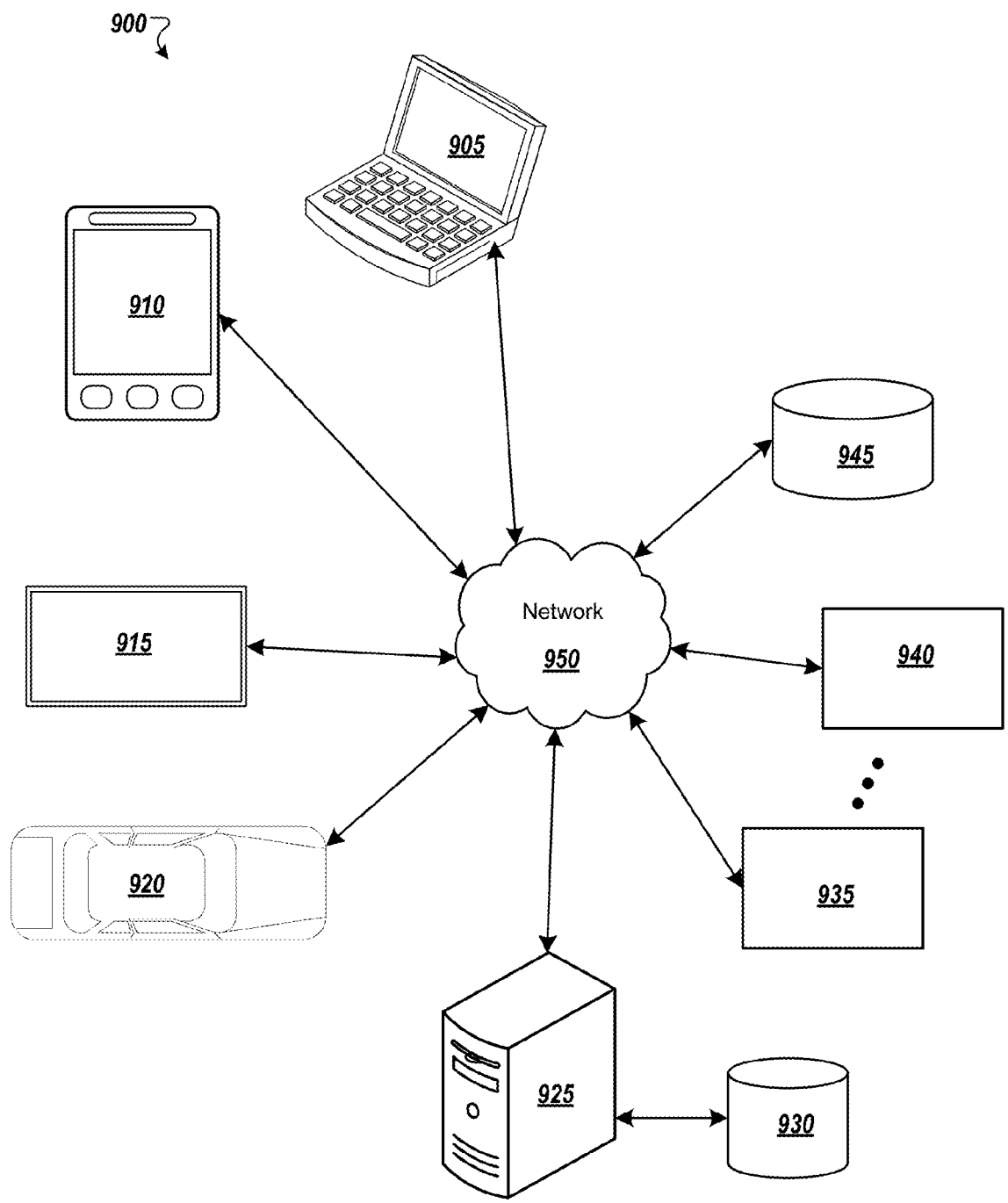
FIG. 9 shows an example environment suitable for some example implementations.

FIG. 9 shows an example environment suitable for some example implementations. Environment 900 includes devices 905-945, and each is communicatively connected to at least one other device via, for example, network 960 (e.g., by wired and/or wireless connections). Some devices may be communicatively connected to one or more storage devices 930 and 945.

An example of one or more devices 905-945 may be computing device 1005 described below in FIGS. 10A and 10B. Devices 905-945 may include, but are not limited to, a computer 905 (e.g., a laptop computing device), a mobile device 910 (e.g., smartphone or tablet), a television 915, a device associated with a vehicle 920, a server computer 925, computing devices 935-940, storage devices 930 and 945.

In some implementations, devices 905-920 may be considered user devices (e.g., devices used by users to access services and/or issue requests, such as on a social network). Devices 925-945 may be devices associated with service providers (e.g., used by service providers to provide services and/or store data, such as webpages, text, text portions, images, image portions, audios, audio segments, videos, video segments, and/or information thereabout).

For example, a client may perform operations associated with the foregoing example implementations, such as FIG. 8 above, including the unpacking operations of the example implementation, using device 905 or 910 on a network supported by one or more devices 925-940. A server may perform operations associated with the foregoing example implementations, such as FIG. 7 above using, including the packing operations of the example implementation, using device 945, via network 950.

Figure 10A:
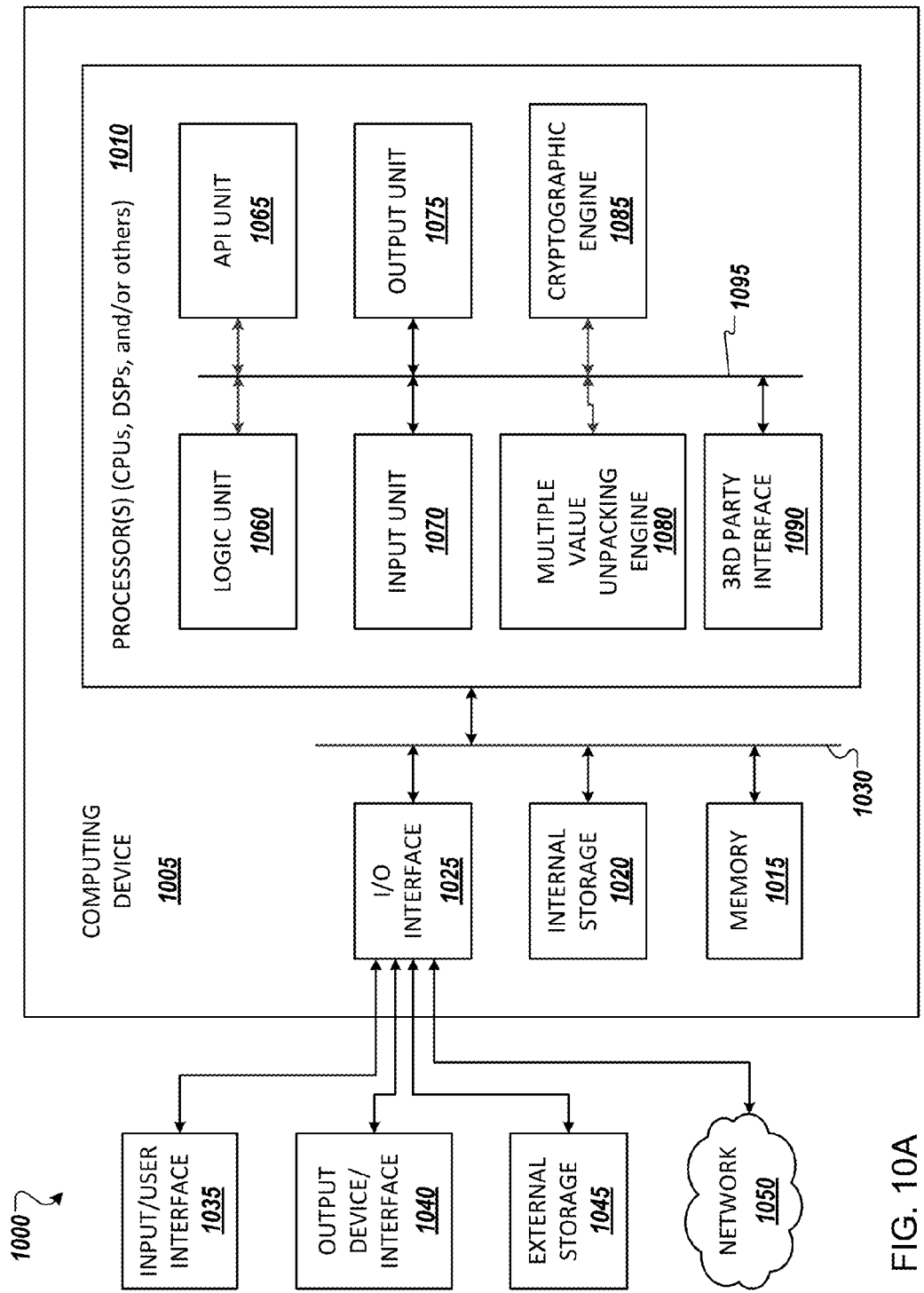
FIGS. 10A and 10B show example computing environments with respective example computing devices suitable for use in some example implementations.
Figure 10B:
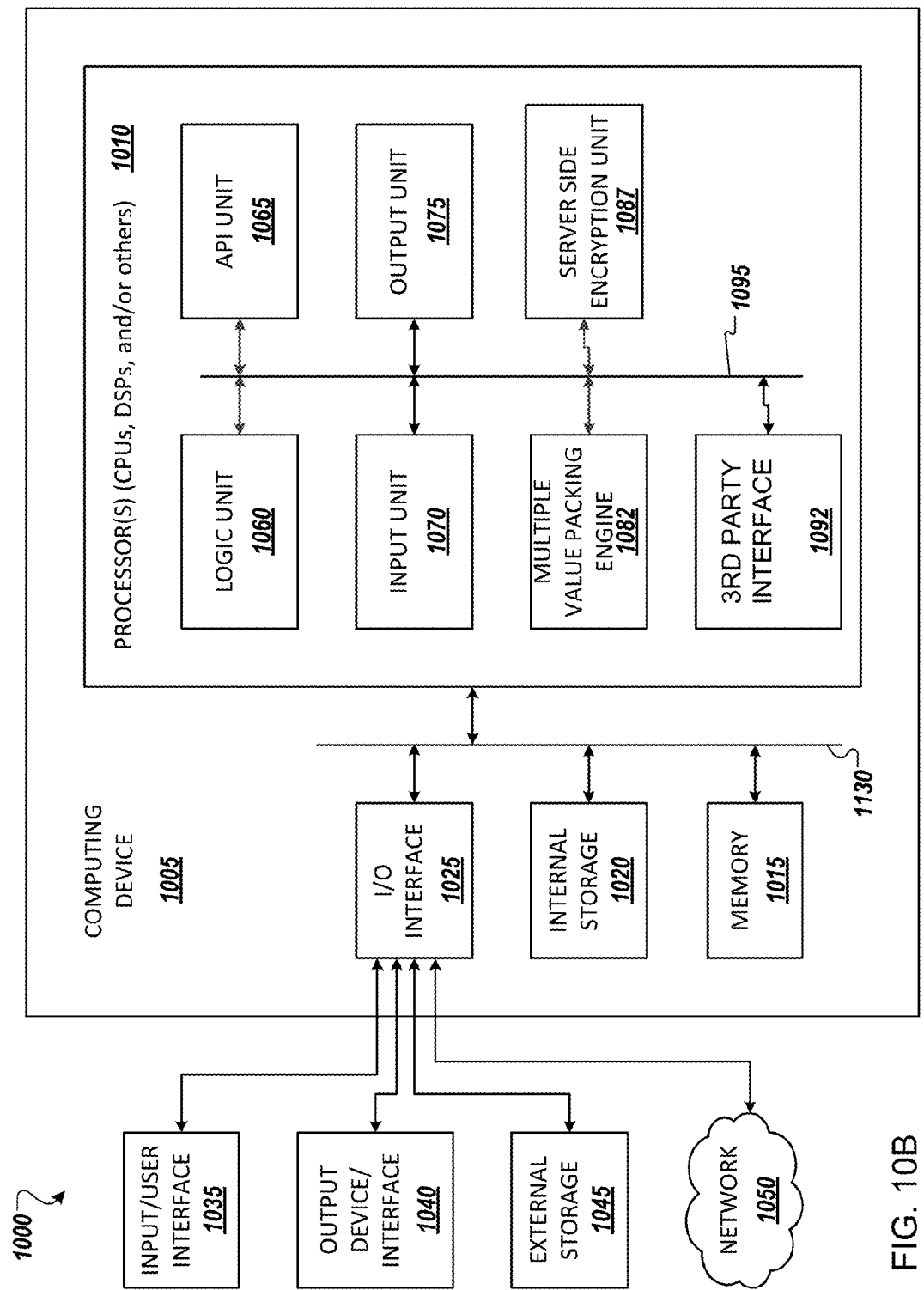

FIGS. 10A-10B shows example computing environments with an example computing devices suitable for use in some example implementations. The common elements of FIGS. 10A and 10B are discussed together, for the sake of clarity and conciseness.

Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

The I/O interface 1025 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

As shown in FIG. 10A, processor(s) 1010 can execute under any operating system (OS) (not shown), in a native or virtual environment. One or more applications can be deployed that include logic unit 1060, application programming interface (API) unit 1065, input unit 1070, output unit 1075, multiple value unpacking engine 1080, cryptographic engine 1085, third party interface 1090, and inter-unit communication mechanism 1095 for the different units to communicate with each other, with the OS, and with other applications (not shown). For example, multiple value unpacking engine 1080, cryptographic engine 1085, and third party interface 1090 may implement one or more processes shown in FIGS. 6 and 8. The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075, multiple value unpacking engine 1080, cryptographic engine 1085, and third party interface 1090). For example, the multiple value unpacking engine 1080 may perform the left shifting (e.g., unpacking) and multiplication as described above with respect to FIGS. 6 and 8. The cryptographic engine 1085 may encrypt IDs of the client, or other values as necessary to perform the operations explained above with respect to FIGS. 6 and 8. The third party interface 1090 may permit a third party, such as a user, operator or administrator, to interface with the computing environment. After input unit 1070 has detected a request, input unit 1070 may use API unit 1065 to communicate the request to multiple value unpacking engine 1080. Multiple value unpacking engine 1080 may, via API unit 1065, interact with the cryptographic engine 1085 to detect and process the request. Using API unit 1065, multiple value unpacking engine 1080 may interact with third party interface 1090 to permit a third party to view or manage the operations at the client side.

In some instances, logic unit 1060 may be configured to control the information flow among the units and direct the services provided by API unit 1065, input unit 1070, output unit 1075, multiple value unpacking engine 1080, cryptographic engine 1085, and third party interface 1090 in some example implementations described above. For example, the flow of one or more processes or implementations may be controlled by logic unit 1060 alone or in conjunction with API unit 1065.

As shown in FIG. 10B, processor(s) 1010 can execute under any operating system (OS) (not shown), in a native or virtual environment. One or more applications can be deployed that include logic unit 1060, application programming interface (API) unit 1065, input unit 1070, output unit 1075, multiple value packing engine 1082, server side encryption unit 1087, third party interface 1092, and inter-unit communication mechanism 1095 for the different units to communicate with each other, with the OS, and with other applications (not shown). For example, multiple value packing engine 1082, server side encryption unit 1087, and third party interface 1092 may implement one or more processes shown in FIGS. 7 and 8. The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075, multiple value packing engine 1082, server side encryption unit 1087, and third party interface 1092). For example, the multiple value packing engine 1082 may perform the generating of each the single payloads and the encrypting of the data values in each of the single payloads (e.g., packing) as described above with respect to FIGS. 7 and 8. The server side encryption unit 1087 may encrypt IDs of the server, or other values as necessary to perform the operations explained above with respect to FIGS. 7 and 8. The third party interface 1092 may permit a third party, such as a user, operator or administrator, to interface with the computing environment from the server side. After input unit 1070 has detected a request, input unit 1070 may use API unit 1065 to communicate the request to multiple value packing engine 1082. Multiple value packing engine 1082 may, via API unit 1065, interact with the server side encryption unit 1087 to detect and process the request. Using API unit 1065, multiple value packing engine 1082 may interact with third party interface 1092 to permit a third party to view or manage the operations at the server side.

In some instances, logic unit 1060 may be configured to control the information flow among the units and direct the services provided by API unit 1065, input unit 1070, output unit 1075, multiple value packing engine 1082, server side encryption unit 1087, and third party interface 1092 in some example implementations described above. For example, the flow of one or more processes or implementations may be controlled by logic unit 1060 alone or in conjunction with API unit 1065.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

In situations or examples in which the implementations discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of performing homomorphic encryption to generate a summation, the method comprising:
    at a client,
        receiving a plurality of encrypted payloads, the encrypted payloads each having a plurality of data values;
        multiplying one or more of the data values of one of the encrypted payloads by one or more other data values in one or more of the other encrypted payloads, in a manner that generates a product that represents the summation of data values corresponding to the multiplied one or more data values of the one of the encrypted payloads and the one or more other data values in the one or more other of the encrypted payloads, wherein each of the encrypted payloads is generated by packing in the data values prior to encryption of each of the encrypted payloads, such that the data values do not cover the most significant bits of each of the encrypted payloads.

2. The computer-implemented method of claim 1, further comprising:
operating on encrypted ones of the plurality of data values representing a vector of one or more of the data values at a plurality of positions, so as to perform at least one of: multiplying the encrypted payloads by encryption of constant values, and multiplying the encrypted payloads to shift the positions of the data values that are associated with the vector, in the payload.

3. The computer-implemented method of claim 2, wherein the multiplying comprises multiplying the one or more of the data values of the one of the encrypted payloads at a first position in the vector by the one or more other data values in the one or more of the other encrypted payloads at a second position in the vector, to generate the product that represents the summation of the data values corresponding to the multiplied one or more data values of the one of the encrypted payloads and the one or more other data values in the one or more other of the encrypted payloads, represented as an unencrypted value at a third position in the vector at the resulting product encrypted payload.

4. The computer-implemented method of claim 1, wherein the data values each of the encrypted payloads are positioned at a lower half of the encrypted payload, and an upper half of each of the encrypted payloads is empty.

5. The computer-implemented method of claim 1, wherein each of the data values on each of the encrypted payloads is spaced apart from other data values on each of the encrypted payloads by a guard having a length that is a prescribed number of bits.

6. The computer-implemented method of claim 1, the multiplying further comprising:
performing an exponentiation operation on the plurality of data values of each of the encrypted payloads to shift a position of one of the data values within each of the encrypted payloads to a prescribed position; and
multiplying the one of the data values at the prescribed position of each of the encrypted payloads by the one or more other data values at the prescribed position of the one or more of the other encrypted payloads.

7. The computer-implemented method of claim 1, wherein the summation comprises a spend value.

8. The computer-implemented method of claim 1, wherein a block size of the payload is 64 bits.

9. The computer-implemented method of claim 1,
the receiving comprising receiving a plurality of first keys associated with a first type of value and each of the encrypted payloads having the plurality of data values, each of the first keys being associated with a corresponding one of the data values within each of the encrypted payloads; and
matching the plurality of first keys associated with the first type of value with a plurality of second keys associated with a second type of value, to define an intersect,
wherein the multiplying comprises multiplying the one or more of the data values of each of the encrypted payloads that is included in the intersect by the one or more other data values in the one or more of the other encrypted payloads that are included in the intersect, to generate the product, which is a ciphertext representation of a summation of the data values in plaintext.

10. The computer-implemented method of claim 9, further comprising:
generating the plurality of second keys associated with the second type of value by encrypting second values to generate encrypted second values and externally-encrypting the encrypted second values.

11. The computer-implemented method of claim 1, further comprising:
blinding the product with a random value r; and
subtracting the random value r from a blinded, decrypted value of the product to generate the summation.

12. A computer-implemented method of performing homomorphic encryption to generate a summation, the method comprising:
at a client,
receiving a plurality of encrypted payloads, the encrypted payloads each having a plurality of data values;
multiplying one or more of the data values of one of the encrypted payloads by one or more other data values in one or more of the other encrypted payloads, in a manner that generates a product that represents the summation of data values corresponding to the multiplied one or more data values of the one of the encrypted payloads and the one or more other data values in the one or more other of the encrypted payloads, the multiplying further comprising performing an exponentiation operation on the plurality of data values of each of the encrypted payloads to shift a position of one of the data values within each of the encrypted payloads to a prescribed position, and multiplying the one of the data values at the prescribed position of each of the encrypted payloads by the one or more other data values at the prescribed position of the one or more of the other encrypted payloads.

13. The computer-implemented method of claim 12, further comprising:
operating on encrypted ones of the plurality of data values representing a vector of one or more of the data values at a plurality of positions, so as to perform at least one of: multiplying the encrypted payloads by encryption of constant values, and multiplying the encrypted payloads to shift the positions of the data values that are associated with the vector, in the payload.

14. The computer-implemented method of claim 13, wherein the multiplying comprises multiplying the one or more of the data values of the one of the encrypted payloads at a first position in the vector by the one or more other data values in the one or more of the other encrypted payloads at a second position in the vector, to generate the product that represents the summation of the data values corresponding to the multiplied one or more data values of the one of the encrypted payloads and the one or more other data values in the one or more other of the encrypted payloads, represented as an unencrypted value at a third position in the vector at the resulting product encrypted payload.

15. The computer-implemented method of claim 12, wherein the data values each of the encrypted payloads are positioned at a lower half of the encrypted payload, and an upper half of each of the encrypted payloads is empty.

16. The computer-implemented method of claim 12, wherein each of the data values on each of the encrypted payloads is spaced apart from other data values on each of the encrypted payloads by a guard having a length that is a prescribed number of bits.

17. The computer-implemented method of claim 12, wherein each of the encrypted payloads is generated by packing in the data values prior to encryption of each of the encrypted payloads, such that the data values do not cover the most significant bits of each of the encrypted payloads.

18. The computer-implemented method of claim 12, wherein the summation comprises a spend value.

19. The computer-implemented method of claim 12, wherein a block size of the payload is 64 bits.

20. The computer-implemented method of claim 12,
the receiving comprising receiving a plurality of first keys associated with a first type of value and each of the encrypted payloads having the plurality of data values, each of the first keys being associated with a corresponding one of the data values within each of the encrypted payloads; and
matching the plurality of first keys associated with the first type of value with a plurality of second keys associated with a second type of value, to define an intersect,
wherein the multiplying comprises multiplying the one or more of the data values of each of the encrypted payloads that is included in the intersect by the one or more other data values in the one or more of the other encrypted payloads that are included in the intersect, to generate the product, which is a ciphertext representation of a summation of the data values in plaintext.

21. The computer-implemented method of claim 20, further comprising:
generating the plurality of second keys associated with the second type of value by encrypting second values to generate encrypted second values and externally-encrypting the encrypted second values.

22. The computer-implemented method of claim 12, further comprising:
blinding the product with a random value r; and
subtracting the random value r from a blinded, decrypted value of the product to generate the summation.

\* \* \* \* \*